United States Patent

Scheideman

Patent Number: 5,443,112
Date of Patent: Aug. 22, 1995

[54] WATER FLOW AND HEAT EXCHANGE CONTROL SYSTEM AND METHOD BETWEEN HEAT SOURCE AND WATER RESERVOIR

[76] Inventor: Floyd P. Scheideman, 1024 W. 52nd St., North, Wichita, Kans. 67204

[21] Appl. No.: 263,049

[22] Filed: Jun. 21, 1994

[51] Int. Cl.⁶ ............................................ F28F 27/02
[52] U.S. Cl. ................................. 165/1; 165/35; 62/238.6; 137/599.1; 4/493
[58] Field of Search ............. 165/35, 36, 40, 34, 165/1; 62/238.6; 4/493, 545

[56] References Cited

U.S. PATENT DOCUMENTS

| | | | |
|---|---|---|---|
| 2,884,197 | 4/1959 | Whittell, Jr. | 165/35 |
| 3,292,598 | 12/1966 | Miller et al. | 165/35 |
| 3,498,072 | 3/1970 | Stiefel | 62/118 |
| 3,926,008 | 12/1975 | Webber | 62/200 |
| 3,976,123 | 8/1976 | Davies | 165/29 |
| 4,032,068 | 6/1977 | Luchtenberg et al. | 165/35 |
| 4,086,956 | 5/1978 | Block et al. | 165/38 |
| 4,141,222 | 2/1979 | Ritchie | 62/238.6 |
| 4,186,872 | 2/1980 | Bland, Jr. et al. | 165/40 |
| 4,232,529 | 11/1980 | Babbitt et al. | 62/160 |
| 4,238,933 | 12/1980 | Coombs | 62/238.6 |
| 4,281,519 | 8/1981 | Spath et al. | 62/238.6 |
| 4,383,419 | 5/1983 | Bottum | 62/238.6 |
| 4,667,479 | 5/1987 | Doctor | 62/93 |
| 4,773,231 | 9/1988 | Sulzberger | 62/238.6 |
| 4,907,418 | 3/1990 | DeFazio | 62/238.6 |
| 5,329,965 | 7/1994 | Gordon | 137/599 |

FOREIGN PATENT DOCUMENTS

| | | | |
|---|---|---|---|
| 0192735 | 11/1982 | Japan | 62/238.6 |
| 0025263 | 2/1991 | Japan | 165/34 |
| 338857 | 11/1930 | United Kingdom | 137/599 |

Primary Examiner—John K. Ford
Attorney, Agent, or Firm—John R. Flanagan

[57] ABSTRACT

A system for controlling water flow and heat exchange is connected between a central air conditioning system and a swimming pool. The system includes a heat exchanger connected to the air conditioning system, a by-pass flow line connected between water flow exit and entry ports of the swimming pool, a pump operable to recirculate water from the pool through the by-pass flow line and back to the pool, inflow and outflow pairs of main and auxiliary flow lines interconnecting inlet and outlet ports of the heat exchanger with the by-pass flow line, a pair of flow control valves interposed in the respective main inflow and outflow flow lines, and a temperature sensing probe connected to the by-pass flow line between the pump and the inflow pair of main and auxiliary flow lines which is operable to detect the temperature of the inflowing water and to control the opening and closing of the flow control valves to regulate the flow of water through the heat exchanger via the inflow and outflow pairs of main and auxiliary flow lines so as to maintain the pool water at a desired temperature.

15 Claims, 1 Drawing Sheet

WATER FLOW AND HEAT EXCHANGE CONTROL SYSTEM AND METHOD BETWEEN HEAT SOURCE AND WATER RESERVOIR

BACKGROUND OF THE INVENTION

1. Field of the Invention

The present invention generally relates to waste heat recovery and, more particularly, is concerned with a water flow and heat exchange control system and method employed between a heat source, such as a central air conditioning system, and a water reservoir, such as a swimming pool.

2. Description of the Prior Art

In the past several decades, the use of air conditioning systems has become commonplace in both commercial and residential applications. Most home and small commercial air conditioning systems employ a closed vapor compression/expansion cycle with heat rejection to ambient air. Such systems include an evaporator portion with a refrigerant expansion valve, an evaporator, and an air circulation fan, and a condenser portion with a compressor, an air condenser, and an air condenser fan. Warm air is passed over the evaporator coil, where it is cooled by the transfer of heat to the liquid refrigerant flowing therethrough. The cooled air then passes to the interior of the building or other enclosure desired to be cooled. The refrigerant is converted to a vapor by absorbing the heat from the warm air. The vaporized refrigerant then flows to a compressor where it is compressed to a high pressure vapor, in the process of being heated to a temperature higher than the temperature of the available heat sink medium. The vapor then flows to the condenser, where it is condensed to a liquid by transfer of its sensible and latent heat to the heat sink medium, which is typically ambient air. The high pressure liquid then flows through a throttling device such as an expansion valve or capillary tube, where the pressure and temperature of the liquid are reduced to the conditions existing in the evaporator. In particular, the temperature of the liquid refrigerant is reduced to a point below the temperature of the air being cooled, thus completing the refrigerant cycle.

According to the basic thermodynamics of the vapor compression refrigeration cycle just described, the amount of energy required to operate the compressor is a function of the pressure and temperature of the refrigerant in the evaporator and the condenser. The condenser pressure and temperature are, in turn, dependent upon the temperature of the heat sink medium, typically ambient air. In general, the power consumed by the compressor is thus directly proportional to the temperature of the heat sink medium. Consequently, it is advantageous to utilize a low temperature heat sink medium where possbile to reduce the power consumption of the compressor. In larger commercial applications this is often accomplished by the use of cooling towers, wherein water is used to absorb the waste heat from the air conditioner and is subsequently evaporated to ambient air. The evaporation process effectively reduces the heat sink temperature of the air conditioner.

It may also be desirable to further conserve energy by recovering the heat rejected to the heat sink medium rather than rejecting the heat to the ambient air. It is well known in the art that the power consumption of an air conditioning system can be decreased by the use of a low temperature heat sink medium, while at the same time recovering the rejected heat for useful purposes. Systems utilizing swimming pool water as a heat sink medium, wherein the need for a swimming pool heater is reduced or eliminated by the simultaneous heating of the water, are disclosed in U.S. patents to Stiefel (U.S. Pat. No. 3,498,072), Webber (U.S. Pat. No. 3,926,008), Davies (U.S. Pat. No. 3,976,123), Babbitt et al (U.S. Pat. No. 4,232,529), Coombs (U.S. Pat. No. 4,238,933), Bottum (U.S. Pat. No. 4,383,419), Doctor (U.S. Pat. No. 4,667,479) and DeFazio (U.S. Pat. No. 4,907,418).

However, it has been perceived by the inventor herein that none of the systems of the aforementioned patents represent an optimum approach to rejected or waste heat recovery for maintaining a swimming pool at a desired temperature. For instance, none of the patents address the problem of how to properly regulate the flow of water through the heat exchanger interposed in the air conditioning system so as to correctly affect the heat rise of the water in the reservoir. Consequently, a need still exists for an improved approach to waste heat recovery for use in heating a swimming pool to and maintaining it at a desired temperature range.

SUMMARY OF THE INVENTION

The present invention provides a water flow and heat exchange control system and method designed to satisfy the aforementioned needs. The control system and method of the present invention not only effectively increases the efficiency of the air conditioning system from which the rejected or waste heat is recovered, but also provides an effectively regulated heat source for a non-potable water reservoir, such as a swimming pool, to maintain the temperature of the swimming pool within a desired temperature range.

Accordingly, the present invention is directed to a system for controlling water flow and heat exchange between a heat source and a water reservoir. The control system comprises: (a) a heat exchanger connected to the heat source; (b) a by-pass flow line connected to exit and entry ports of the water reservoir; (c) means connected to the by-pass flow line for recirculating water flow from the water reservoir through the by-pass flow line and back to the water reservoir; (d) first means for communicating water flow from the by-pass flow line to the heat exchanger and back to the by-pass flow line at a first flow rate; (e) second means for communicating water flow from the by-pass flow line to the heat exchanger and back to the by-pass flow line at a second flow rate being less than the first flow rate; (f) means coupled to the first communicating means for controlling water flow at the first flow rate by selectively opening and closing water flow between the by-pass flow line and the heat exchanger at the first flow rate; and (g) means for detecting the temperature of water inflowing from the water reservoir to the by-pass flow line and for actuating the controlling means to open and close water flow between the by-pass flow line and the heat exchanger at the first flow rate in response to the temperature detected so as to maintain the water reservoir at a desired temperature range. The first water flow communicating means is a pair of inflow and outflow main flow lines interconnecting respective inlet and outlet ports of the heat exchanger with the by-pass flow line. The controlling means is a pair of control valves each interposed in one of the respective inflow and outflow main flow lines. The detecting means is a temperature sensing probe coupled to the by-pass flow line and to the control valves to control opening and closing of the control valves in response to the temperature of water sensed in the by-pass flow line. The second water flow communicating means is a pair of inflow and outflow auxiliary flow lines interconnecting respective inlet and outlet ports of the heat exchanger with the by-pass flow line. The main flow lines are larger in diameter size than the auxiliary flow lines such that water flows at a higher rate through the main flow lines than through the auxiliary flow lines.

The present invention is also directed to a method for controlling water flow and heat exchange between a heat source and water source. The control method comprises the steps of: (a) providing a heat exchanger connected to the heat source; (b) providing a by-pass flow line connected to exit and entry ports of the water reservoir; (c) recirculating water flow from the water reservoir through the by-pass flow line and back to the water reservoir; (d) communicating water flow from the by-pass flow line to the heat exchanger and back to the by-pass flow line at a first flow rate; (e) communicating water flow from the by-pass flow line to the heat exchanger and back to the by-pass flow line at a second flow rate being less than the first flow rate; (f) controlling water flow at the first flow rate by selectively opening and closing water flow between the by-pass flow line and the heat exchanger at the first flow rate; and (g) detecting the temperature of water inflowing from the water reservoir to the by-pass flow line and actuating the opening and closing of water flow between the by-pass flow line and the heat exchanger at the first flow rate in response to the temperature detected so as to maintain the water reservoir at a desired temperature range. The communicating of water flow from the by-pass flow line to the heat exchanger and back to the by-pass flow line at the first flow rate is carried out by providing a pair of inflow and outflow main flow lines interconnecting respective inlet and outlet ports of the heat exchanger with the by-pass flow line. The communicating of water flow from the by-pass flow line to the heat exchanger and back to the by-pass flow line at the second flow rate is carried out by providing a pair of inflow and outflow auxiliary flow lines interconnecting respective inlet and outlet ports of the heat exchanger with the by-pass flow line. The controlling of water flow at the first flow rate by selectively opening and closing water flow between the by-pass flow line and the heat exchanger at the first flow rate is carried out by providing a pair of control valves each interposed in one of said respective inflow and outflow main flow lines. The detecting of water temperature is carried out by providing a temperature sensing probe coupled to the by-pass flow line and to the control valves to control opening and closing of the control valves in response to the temperature of water sensed in the by-pass flow line.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
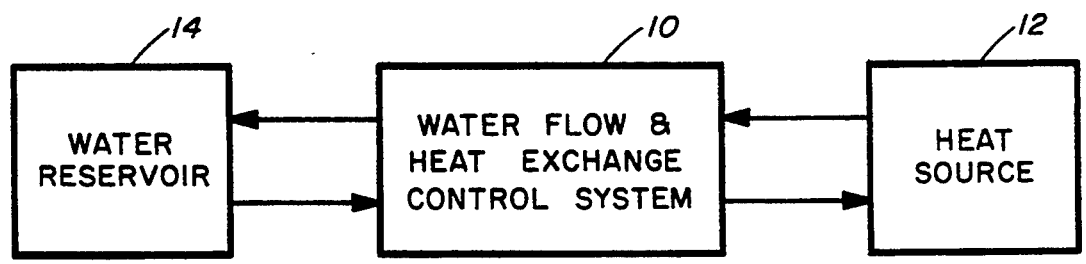
FIG. 1 is a block diagram of a water flow and heat exchange control system connected between a heat source in the form of a central air conditioning system and a water reservoir, such as a swimming pool.

Referring to the drawings, and particularly to FIG. 1, there is illustrated a water flow and heat exchange control system of the present invention, generally designated 10, being connected between a heat source 12, preferably in the form of a central air conditioning system, and a water reservoir 14, preferably in the form of a swimming pool. The water flow and heat exchange control system 10 is operable to recover waste heat from the central air conditioning system 12 and to use it to heat the swimming pool 14.

Figure 2:
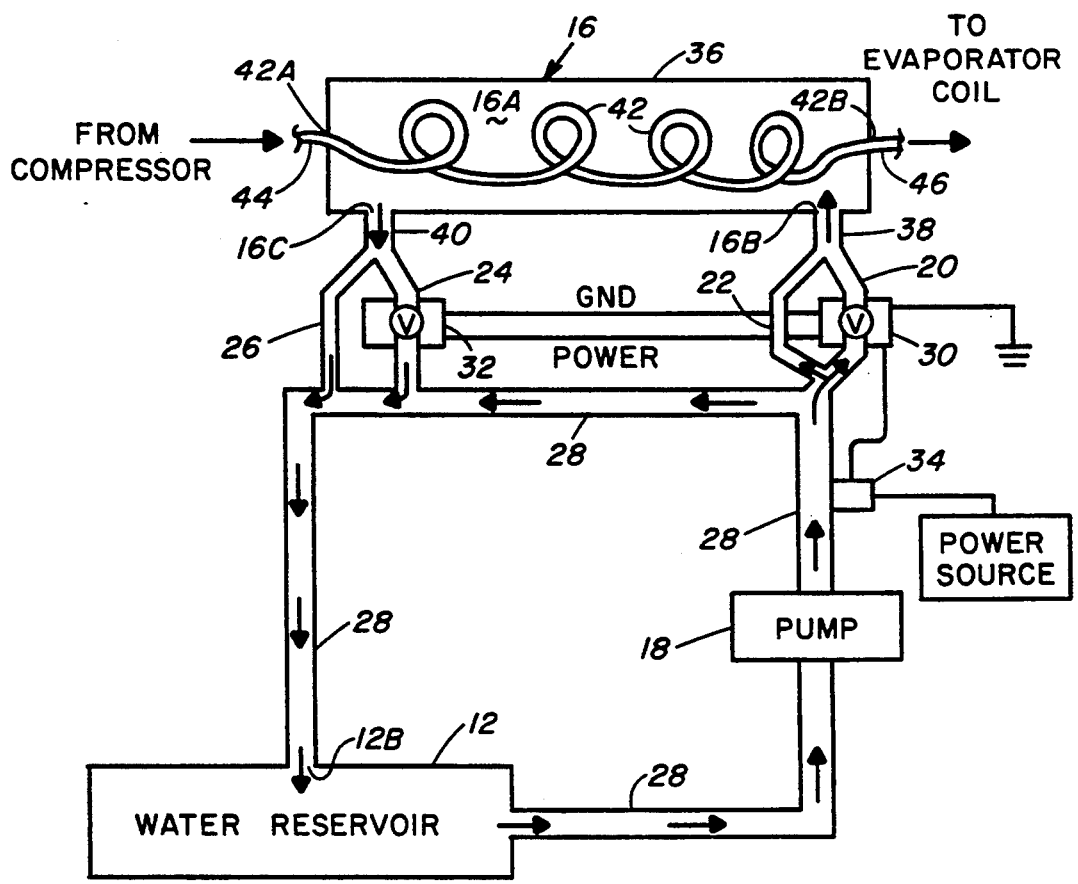
FIG. 2 is a schematic diagram of the water flow and heat exchange control system of the present invention.

Referring to FIG. 2, there is illustrated in detail the water flow and heat exchange control system 10 of the present invention. Basically, the control system 10 includes a heat exchanger 16, a pump 18, inflow and outflow pairs of main and auxiliary flow lines 20, 22 and 24, 26 connected to the central air conditioning system 12, and a by-pass flow line 28 extending between water flow exit and entry ports 12A, 12B of the pool 12 and interconnecting the pump 18 and inflow and outflow pairs of main and auxiliary flow lines 20, 22 and 24, 26 therewith. The control system 10 also includes a pair of flow control valves 30, 32 and a temperature sensing probe 34.

As schematically shown in FIG. 2, the heat exchanger 16 includes a housing 36 having an internal chamber 16A and a pair of inlet and outlet ports 16B, 16C connected respectively via inflow and outflow conduits 38, 40 to provide flow communication between the internal chamber 16A and the inflow and outflow pairs of main and auxiliary flow lines 20, 22 and 24, 26. The heat exchanger 16 also includes a series of coils 42 disposed in the internal chamber 16A of the housing 36 and connected at opposite inlet and outlet ends 42A, 42B respectively to conduits 44, 46 extending from the high pressure side of a compressor (not shown) and from an evaporator coil (not shown) of the central air conditioning system 12.

The pump 18 is interposed in the by-pass flow line 28 between the swimming pool 12 and inflow pair of main and auxiliary flow lines 20, 22. The pump 18 is operable to recirculate water from the pool 12 through the by-pass flow line 28 and back to the pool 12. The inflow and outflow pairs of main and auxiliary flow lines 20, 22 and 24, 26 interconnect the respective inlet and outlet ports 16B, 16C of the heat exchanger 16 with the by-pass flow line 28. The main flow lines 20, 24 are substantially larger in diameter size than the auxiliary flow lines 22, 26, for instance $1\frac{1}{2}$ inch pipe compared to $\frac{1}{2}$ inch pipe, such that water flows at a substantially higher rate through the main flow lines 20, 24 than through the auxiliary flow lines 22, 26.

The flow control valves 30, 32 are interposed in the respective inflow and outflow main flow lines 20, 24 so as to control the rate of flow of water through the heat exchanger 16 by either opening or closing the the flow through the inflow and outflow main flow lines 20, 24. For instance, if the flow control valves 30, 32 are placed in closed conditions, then water enters and exits the heat exchanger 16 at a lower flow rate only respectively from the inflow auxiliary flow line 22 and to the outflow auxiliary flow line 26. Since the water is traveling at the lower flow rate, its transit time through the heat exchanger 16 is longer, thus allowing the water to be heated to a higher temperature. On the other hand, if the flow control valves 30, 32 are placed in opened conditions, then water flows through the heat exchanger 16 at the higher combined rate of flow from both the inflow main and auxiliary flow lines 20, 22 to the outflow main and auxiliary flow lines 24, 26 so that the transit time of the water through the heat exchanger 16 is now shorter and the temperature to which the water can be heated is lower. Thus, if it is desired to elevate the temperature of the water in the pool 12, then the flow control valves 30, 32 are placed in their closed conditions, whereas if it is desired to maintain the temperature of the water in the pool 12, then the flow control valves 30, 32 are placed in their opened conditions.

The temperature sensing probe 34 is connected to the by-pass flow line 28 between the pump 18 and the inflow pair of main and auxiliary flow lines 20, 22. Receiving electrical power from a suitable power source 48, the probe 34 is operable to detect the temperature of the inflowing water from the pool 12 and to control the opening and closing of the flow control valves 30, 32 to regulate the flow rate of water through the heat exchanger 16 via the inflow and outflow main flow lines 20, 24 so as to maintain the water of the pool 14 at the desired temperature range, for example near to 86°. For instance, the probe 34 may be set to close the flow control valves 30, 32 when a preset temperature is reached, for example 82°. Thus, when the pool water temperature reaches 82°, flow control valves 30, 32 are closed by the probe 34 and most of the water is diverted through the by-pass flow line 28 past the main flow lines 20, 24. However, water does flow at the lower flow rate through the auxiliary flow lines 22, 26 to and from the heat exchanger 16, which keeps the water in the heat exchanger 16 for a longer period of time and allowing greater heating of the water to occur therein. When the pool water reaches 86° the probe 34 then opens the flow control valves 30, 32. This allows the water being recirculated by the pump 18 to flow at a higher rate through the heat exchanger 16 such that the higher volume of water will not recover as much heat and thus will not cause a temperature rise of the pool water, but yet at the same time does cool the refrigerant of the air conditioning system 14 traveling through the heat exchanger coils 42 so as to conserve energy usage by the air conditioning system 14. Preferably, by way of example, probe 34 can be made up of two separate bi-metallic temperature sensors, each set to activate and respectively to open and close the valves 30, 32 at the respective temperatures mentioned.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A system for controlling water flow and heat exchange between a heat source and a water reservoir, said system comprising:
    (a) a heat exchanger connected to the heat source;
    (b) a by-pass flow line connected to exit and entry ports of the water reservoir;
    (c) means connected to said by-pass flow line for recirculating water flow from the water reservoir through said by-pass flow line and back to the water reservoir;
    (d) first means for communicating water flow from said by-pass flow line to said heat exchanger and back to said by-pass flow line at a first flow rate;
    (e) second means for communicating water flow from said by-pass flow line to said heat exchanger and back to said by-pass flow line at a second flow rate being less than said first flow rate;
    (f) means coupled to said first communicating means for controlling water flow at said first flow rate by selectively opening and closing water flow between said by-pass flow line and said heat exchanger at said first flow rate; and
    (g) means for detecting the temperature of water inflowing from the water reservoir to said by-pass flow line and for actuating said controlling means to open and close water flow between said by-pass flow line and said heat exchanger at said first flow rate in response to the temperature detected so as to maintain the water reservoir at a desired temperature range;
    (h) said first water flow communicating means being a pair of inflow and outflow main flow lines interconnecting respective inlet and outlet ports of said heat exchanger with said by-pass flow line, said controlling means being a pair of control valves each interposed in one of said respective inflow and outflow main flow lines.

2. The system of claim 1 wherein said recirculating means is a pump interposed in said by-pass flow line.

3. The system of claim 2 wherein said pump is interposed in said by-pass flow line between the exit port of the water reservoir and said first and second water flow communicating means.

4. The system of claim 1 wherein said detecting means is a temperature sensing probe coupled to said by-pass flow line and to said controlling means.

5. The system of claim 1 wherein said detecting means is a temperature sensing probe coupled to said by-pass flow line and to said control valves to control opening and closing of said control valves in response to the temperature of water sensed in said by-pass flow line.

6. A system for controlling water flow and heat exchange between a heat source and a water reservoir, said system comprising:
    (a) a heat exchanger connected to the heat source;
    (b) a by-pass flow line connected to exit and entry ports of the water reservoir;
    (c) means connected to said by-pass flow line for recirculating water flow from the water reservoir through said by-pass flow line and back to the water reservoir;
    (d) first means for communicating water flow from said by-pass flow line to said heat exchanger and back to said by-pass flow line at a first flow rate;
    (e) second means for communicating water flow from said by-pass flow line to said heat exchanger and back to said by-pass flow line at a second flow rate being less than said first flow rate;.
    (f) means coupled to said first communicating means for controlling water flow at said first flow rate by selectively opening and closing water flow between said by-pass flow line and said heat exchanger at said first flow rate; and
    (g) means for detecting the temperature of water inflowing from the water reservoir to said by-pass flow line and for actuating said controlling means to open and close water flow between said by-pass flow line and said heat exchanger at said first flow rate in response to the temperature detected so as to maintain the water reservoir at a desired temperature range;

(h) said first water flow communicating means being a pair of inflow and outflow main flow lines interconnecting respective inlet and outlet ports of said heat exchanger with said by-pass flow line;

(i) said second water flow communicating means being a pair of inflow and outflow secondary flow lines interconnecting respective inlet and outlet ports of said heat exchanger with said by-pass flow line.

7. The system of claim 6 wherein said main flow lines are larger in diameter size than said auxiliary flow lines such that water flows at a higher rate through said main flow lines than through said auxiliary flow lines.

8. A system for controlling water flow and heat exchange between a heat source and a water reservoir, said system comprising:

(a) a heat exchanger connected to the heat source;

(b) a by-pass flow line connected to the water reservoir;

(c) a pump connected to said by-pass flow line and being operable to recirculate water from the water reservoir through said by-pass flow line and back to the water reservoir;

(d) pairs of inflow and outflow main and auxiliary flow lines interconnecting respective inlet and outlet ports of said heat exchanger with said by-pass flow line;

(e) a pair of control valves each interposed in one of said respective inflow and outflow main flow lines; and (f) a probe connected to said by-pass flow line between said pump and said pair of inflow main and auxiliary flow lines and being operable to detect the temperature of the inflowing water in said by-pass flow line and to control the opening and closing of said control valves to regulate the flow of water through said heat exchanger via said pairs of inflow and outflow main and auxiliary flow lines so as to maintain the water reservoir at a desired temperature range.

9. The system of claim 8 wherein said main flow lines are larger in diameter size than said auxiliary flow lines such that water flows at a higher rate through said main flow lines than through said auxiliary flow lines.

10. A method for controlling water flow and heat exchange between a heat source and a water reservoir, said control method comprising the steps of:

(a) providing a heat exchanger connected to the heat source;

(b) providing a by-pass flow line connected to exit and entry ports of the water reservoir;

(c) recirculating water flow from the water reservoir through the by-pass flow line and back to the water reservoir;

(d) communicating water flow from the by-pass flow line to the heat exchanger and back to the by-pass flow line at a first flow rate;

(e) communicating water flow from the by-pass flow line to the heat exchanger and back to the by-pass flow line at a second flow rate being less than the first flow rate;

(f) controlling water flow at the first flow rate by selectively opening and closing water flow between the by-pass flow line and the heat exchanger at the first flow rate; and (g) detecting the temperature of water inflowing from the water reservoir to the by-pass flow line and actuating the opening and closing of water flow between the by-pass flow line and the heat exchanger at the first flow rate in response to the temperature detected so as to maintain the water reservoir at a desired temperature range;

(h) said communicating of water flow from the by-pass flow line to the heat exchanger and back to the by-pass flow line at the first flow rate being carried out by providing a pair of inflow and outflow main flow lines interconnecting respective inlet and outlet ports of the heat exchanger with the by-pass flow line.

11. The method of claim 10 wherein said communicating of water flow from the by-pass flow line to the heat exchanger and back to the by-pass flow line at the second flow rate is carried out by providing a pair of inflow and outflow auxiliary flow lines interconnecting respective inlet and outlet ports of the heat exchanger with the by-pass flow line.

12. The method of claim 10 wherein said controlling of water flow at the first flow rate by selectively opening and closing water flow between the by-pass flow line and the heat exchanger at the first flow rate is carried out by providing a pair of control valves each interposed in one of said respective inflow and outflow main flow lines.

13. The method of claim 12 wherein said detecting of the temperature of water inflowing from the water reservoir to the by-pass flow line and actuating the opening and closing of water flow between the by-pass flow line and the heat exchanger at the first flow rate is carried out by a temperature sensing probe interposed in the by-pass flow line and coupled to said control valves to control opening and closing of said control valves in response to the temperature of water sensed in said by-pass flow line.

14. The method of claim 12 wherein said communicating of water flow from the by-pass flow line to the heat exchanger and back to the by-pass flow line at the second flow rate is carried out by providing a pair of inflow and outflow auxiliary flow lines interconnecting respective inlet and outlet ports of the heat exchanger with the by-pass flow line.

15. The method of claim 14 wherein said main flow lines are provided larger in diameter size than said auxiliary flow lines such that water flows at a higher rate through said main flow lines than through said auxiliary flow lines.

* * * * *